US008997655B1

(12) United States Patent
Ranson et al.

(10) Patent No.: US 8,997,655 B1
(45) Date of Patent: Apr. 7, 2015

(54) GAS GENERATING SYSTEM

(75) Inventors: Justin W. Ranson, Oxford, MI (US);
Deborah L. Hordos, Troy, MI (US);
Sean P. Burns, Almont, MI (US)

(73) Assignee: TK Holdings Inc., Armada, MI (US)

( * ) Notice: Subject to any disclaimer, the term of this patent is extended or adjusted under 35 U.S.C. 154(b) by 121 days.

(21) Appl. No.: 12/794,567

(22) Filed: Jun. 4, 2010

Related U.S. Application Data

(60) Provisional application No. 61/217,793, filed on Jun. 4, 2009.

(51) Int. Cl.
*B60R 21/264* (2006.01)

(52) U.S. Cl.
CPC .................................. *B60R 21/2644* (2013.01)

(58) Field of Classification Search
USPC .................................... 102/530, 531; 280/741
See application file for complete search history.

(56) References Cited

U.S. PATENT DOCUMENTS

| | | | | |
|---|---|---|---|---|
| 2,995,088 A | * | 8/1961 | Asplund | 102/202 |
| 4,561,675 A | * | 12/1985 | Adams et al. | 280/734 |
| 5,275,433 A | * | 1/1994 | Klober et al. | 280/741 |
| 5,468,017 A | * | 11/1995 | Kirsch et al. | 280/741 |
| 5,501,152 A | * | 3/1996 | Zeuner et al. | 102/292 |
| 5,762,370 A | * | 6/1998 | Lindsey et al. | 280/741 |
| 5,975,570 A | * | 11/1999 | Bosio | 280/741 |
| 6,053,531 A | * | 4/2000 | Katsuda et al. | 280/741 |
| 6,126,197 A | * | 10/2000 | Muir et al. | 280/741 |
| 6,170,869 B1 | * | 1/2001 | Tomiyama | 280/741 |
| 6,177,028 B1 | * | 1/2001 | Kanda et al. | 252/186.2 |
| 6,251,200 B1 | * | 6/2001 | Dunne | 149/108.4 |
| 6,290,256 B1 | * | 9/2001 | McFarland et al. | 280/736 |
| 6,481,747 B1 | * | 11/2002 | Astrauskas et al. | 280/741 |
| 6,877,435 B2 | * | 4/2005 | Daoud | 102/530 |
| 7,147,689 B1 | * | 12/2006 | Miller | 95/92 |
| 7,267,365 B2 | * | 9/2007 | Quioc | 280/736 |
| 7,537,241 B2 | * | 5/2009 | Domazet et al. | 280/741 |
| 2005/0263994 A1 | * | 12/2005 | Quioc | 280/741 |
| 2007/0044675 A1 | * | 3/2007 | Burns et al. | 102/530 |
| 2007/0095035 A1 | * | 5/2007 | Quioc | 55/462 |
| 2009/0091110 A1 | * | 4/2009 | Nakayasu et al. | 280/741 |
| 2010/0225099 A1 | * | 9/2010 | Shiraishi et al. | 280/741 |

* cited by examiner

*Primary Examiner* — Reginald Tillman, Jr.
(74) *Attorney, Agent, or Firm* — L.C. Begin & Associates, PLLC.

(57) ABSTRACT

A gas generator containing perforate internal chambers, each chamber in vapor communication with at least one other chamber in the gas generator, is provided. When granulated compositions are utilized in one or more of the chambers, permeable materials such as cheesecloth, neoprene, Tyvek™, metal or non-metallic screen, and other suitable fluid permeable materials, may be provided to physically seal the perforations of the various chambers, thereby separating the granulated composition(s) contained therein. In this way, off-gas products formed naturally over time may be effectively managed to ensure expected performance criteria of the associated inflator.

9 Claims, 3 Drawing Sheets

US 8,997,655 B1

GAS GENERATING SYSTEM

CROSS-REFERENCE TO RELATED APPLICATIONS

This application claims the benefit of U.S. Provisional Application Ser. No. 61/217,793 filed on Jun. 4, 2009.

TECHNICAL FIELD

The present invention relates to gas generators having an auto-ignition chamber/booster chamber, and a primary gas generating/combustion chamber. More particularly, the present invention relates to an improvement in the state of the art, whereby off-gas products formed within the gas generator over time are effectively re-mediated to ensure repeatability of performance.

BACKGROUND OF THE INVENTION

The present invention relates to gas generators in general, and more specifically, relates to inflators in vehicle occupant protection systems. Gas generators typically include a primary gas generant to produce sufficient amounts of gas to inflate an associated airbag and/or actuate an associated seatbelt pretensioner, for example.

As an enhanced safety feature, gas generators may be provided with an auto-ignition composition that automatically ignites at a relatively low temperature should a fire occur. In this way, the primary gas generant is safely managed to combust in a normal manner, notwithstanding the occurrence of the fire.

A booster composition may also be employed, whereby ignition of the booster composition rapidly increases the internal pressure of the inflator thereby ensuring an adequate combustion pressure for optimal combustion of the primary gas generant.

One concern that may be present with the use of the auto-ignition composition, and perhaps with the use of chemical compositions in general, is the potential for certain constituents in the compositions to age over extended periods of time in widely differing global climates, for example. Off-gassing, or the release of gases liberated by heat over time from various compositions within the gas generator, could occur and result in variability in the performance of the gas generator. To ensure consistency of performance of the inflator in the presence of "off-gases", or to reduce potential variability of the associated functions of the respective compositions within the gas generator, it would be an improvement in the art to mitigate the effect of any potential off-gas products.

Accordingly, ongoing efforts in the design of automotive gas generating systems, for example, include initiatives that would manage any potential performance variability due to off-gassing over time.

SUMMARY OF THE INVENTION

The above-referenced concerns are resolved by a gas generator containing an auto-ignition/booster composition within an auto-ignition/booster chamber, and a primary gas generant within a gas generant combustion chamber, wherein the inflator further contains a permeable separator between the auto-ignition/booster chamber and the primary gas generator. In accordance with the present invention, any potential off-gas products of the associated auto-ignition composition are able to migrate from the auto-ignition chamber to the primary gas generant/combustion chamber. As such, any off-gas products are sufficiently diluted or adsorbed within the overall internal environment of the inflator, thereby enhancing the performance of the inflator.

In yet another aspect of the invention, an adsorbing agent such as zeolite may also be included within the inflator thereby providing a chemical sink for any potential off-gas products, and even further enhancing the performance of the inflator.

In essence, the present inflator provides fluid or vapor communication between two or more of the various chambers of the inflator prior to actuation of the inflator. Accordingly, the auto-ignition chamber, the booster chamber(s), and the primary gas generant chamber(s), or more specifically, each chamber within the inflator, would be in vapor communication with at least one other chamber within the inflator. To facilitate vapor communication between the chambers, the various chamber walls would be perforated, and if desired, covered with a permeable material such as cheesecloth, Tyvek™, or non-metallic or metallic screen for example.

DETAILED DESCRIPTION OF PREFERRED EMBODIMENTS

The present invention broadly comprises a gas generator or inflator that may be formed with or without the wire mesh or expanded metal filter required in earlier designs for removing particulate materials from and cooling the stream of inflation gas upon combustion. Selection of suitable gas generant compositions capable of combusting to produce inflation gas without a substantial quantity of particulates may obviate the need for a conventional filter. Obviating the need for a relatively heavy wire-mesh or expanded metal filter in the gas generating system allows the device to be simpler, lighter, less expensive and easier to manufacture. Nevertheless, although the inflator described illustrates an inflator without an associated metallic filter, it will be appreciated that the inflator described is for exemplary purposes only. As such, inflators containing a metallic filter are also contemplated in accordance with the present invention. All of the component parts of the present invention are known in the art or manufactured by known processes.

Figure 1:
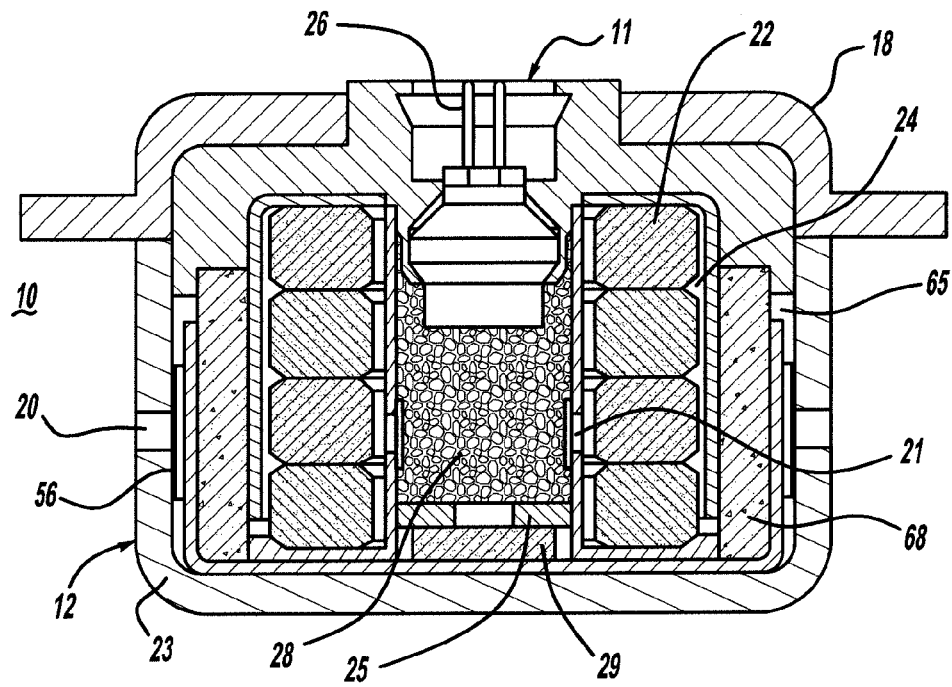
FIG. 1 is a cross-sectional side view of a first embodiment of a gas generating system in accordance with the present invention.

FIG. 1 shows a gas generating system 10 incorporating a porous media filter 68 in accordance with the present invention. Gas generating system 10 may be utilized, for example, as a driver side inflator for inflating a driver side airbag. As seen in FIG. 1, gas generating system 10 includes a housing 12 formed by bonding or welding together a lower housing portion 23 and an upper housing portion 18 in a nested relationship. Upper housing portion 18 contains an aperture for receiving an igniter assembly 11 therethrough. Igniter assembly 11 is welded or otherwise secured to upper housing portion 18. A plurality of gas discharge apertures 20 are spaced circumferentially around lower housing portion 23 to enable fluid communication between an interior of housing 12 and an exterior of the housing. The upper and lower housing portions are fabricated (for example, by stamping, casting, forming, extrusion, or some other suitable process) from a rigid material such as carbon steel or stainless steel.

Openings 20 may be covered with a foil 56 such as aluminum or stainless steel foil to prevent the incursion of water vapor into gas generating system housing 12. The foil 56, sometimes referred to as "burst foil" is typically of a thickness of from 0.01 to about 0.20 mm. The foil 56 is typically adhered to an interior surface of the gas generating system housing through the use of an adhesive.

Gas generating system 10 includes a first inflation fluid source positioned within the housing for releasably storing, generating, or otherwise providing an inflation fluid for inflating an inflatable element (for example, an airbag) of a vehicle occupant restraint system. In the embodiment shown in FIG. 1, the first inflation fluid source comprises a gas generant composition 22 positioned within a combustion chamber 24 formed within the housing.

Primary gas generant 22 may be any known gas generant composition useful for airbag application and is exemplified by, but not limited to, compositions and processes described in U.S. Pat. Nos. 5,035,757, 5,872,329, 6,074,502, 6,287,400, 6,306,232 and 6,475,312 each incorporated by reference herein. Other suitable 105 compositions are set forth in the U.S. patent application Ser. No. 10/407,300 and Ser. No. 60/369,775, incorporated by reference herein. As used herein, the term "smokeless" should be generally understood to mean such propellants as are capable of combustion yielding at least about 90% gaseous products based on a total product mass; and, as a corollary, less than about 10% solid products based on a total product mass. It has been generally found that filters as used in other gas generating system designs can be eliminated by using smokeless 110 compositions having the described combustion characteristics.

Igniter assembly 11 includes an igniter 26 positioned so as to enable fluid communication with gas generant 22, for igniting the gas generant upon occurrence of a crash event. In the embodiment shown in FIG. 1, igniter assembly 11 is positioned and secured within an opening formed in upper housing portion 18 using known methods. In alternative embodiments shown in FIG. 4 and FIG. 5, a perforated igniter support tube 84a may be welded or otherwise fixed within housing 12 to support igniter 26. The perforated support tube 84 allows a flame front generated by igniter 26 to pass to gas generant 22, thereby igniting the gas generant and producing an inflating gas. In accordance with the present invention, the perforated igniter support tubes 25, 84, and 84a are not sealed to prevent vapor communication, but instead permits vapor communication between the interior of tube 84a and the interior of the gas generant chamber 24. Igniter 26 may be formed as known in the art. One exemplary igniter construction is described in U.S. Pat. No. 6,009,809, herein incorporated by reference.

As shown in FIGS. 1, 2, 4, and 5, and referring again to tubes 25, 25a, 84, and 84a, the tubes are formed with one or more perforations 21 that may if desired be covered with a breathable material 160. The breathable or permeable material may be formed from a Tyvec™, nylon, neoprene, cheesecloth, or other material that contains permeable interstices that permit the transfer of vapor between the ignition chamber and the gas generant 125 chamber, but otherwise restrict passage of the auto-ignition/booster (AIB) composition into the gas generant chamber, and also restricts passage of the gas generant into tube 84. In particular, if either the AIB or booster composition, or the gas generant composition, is in granular form, a breathable material may be used to retain the granulated material. It will be appreciated that the interstitial cavities within the breathable material 160 are iteratively sized to retain the respective granules of either the AIB, booster, and/or gas generant compositions. If retention of any of these compositions is not necessary because all are provided in tablet or pelletized form, then the tubes 84a may simply be perforated with open apertures 21.

When granulated compositions are utilized in one or more of the chambers, permeable materials such as cheesecloth, neoprene, Tyvek™, metal or non-metallic screen, and other suitable fluid permeable materials, may be provided to physically seal the perforations of the various chambers, thereby separating the granulated 135 composition(s) contained therein. In this way, off-gas products formed naturally over time may be effectively managed to ensure and expected performance criteria of the associated inflator, without commingling the various compositions employed throughout the inflator.

In yet another aspect of the invention, an adsorbing agent, such as zeolite or clay, for example, may also be included within the inflator thereby providing a chemical sink for any potential off-gas products, and even further enhancing the performance of the inflator.

In accordance with the present invention, and referring again to FIG. 1, a quantity of a known booster propellant 28, exemplified by the compositions of U.S. Pat. No. 5,035,757, may be positioned within housing 12 so as to enable fluid communication between the booster propellant and gas generant composition 22 prior to and upon activation of the gas generating system.

A perforate tube 25 is positioned within the gas generating system housing to enclose igniter 26 and to house booster propellant 28. Tube 25 may be extruded, drawn, or otherwise metal formed and may be made from carbon steel, stainless steel, or any other suitable metal or metal alloy. Booster propellant 28 may be positioned in perforated tube 25 to facilitate combustion of gas generant 22, in a manner known in the art. Activation of igniter 26 produces combustion of the booster propellant, thereby effecting ignition of gas generant composition 22. In addition, a cavity may be formed in an end surface of the tube for accommodating a quantity of a known heat-activated auto-ignition compound 29. In accordance with the present invention, tube 25 is not sealed, and therefore provides continuous vapor communication between tube 25 and other chambers in the inflator 10.

Auto-ignition compound 29 may be positioned within the gas generating system so as to enable fluid communication between the auto-ignition compound and gas generant 22 and/or booster propellant 28 upon 155 activation of the gas generating system. In a manner known in the art, ignition of gas generant 22 is produced by ignition of auto-ignition material 29 resulting in combustion of booster propellant 28. Auto ignition material 29 is a pyrotechnic material which is ignited by exposure to a temperature lower than the ignition temperature of gas generant 22 and/or booster propellant 28. Auto-ignition material 29 produces a hot gas/particulate effluent when ignited in response to elevated gas generating system housing temperatures experienced, for example, during a vehicle fire. Suitable auto ignition materials are known to those skilled in the art. Examples of suitable auto-ignition materials are nitro-cellulose based compositions and gun powder.

Figure 4:
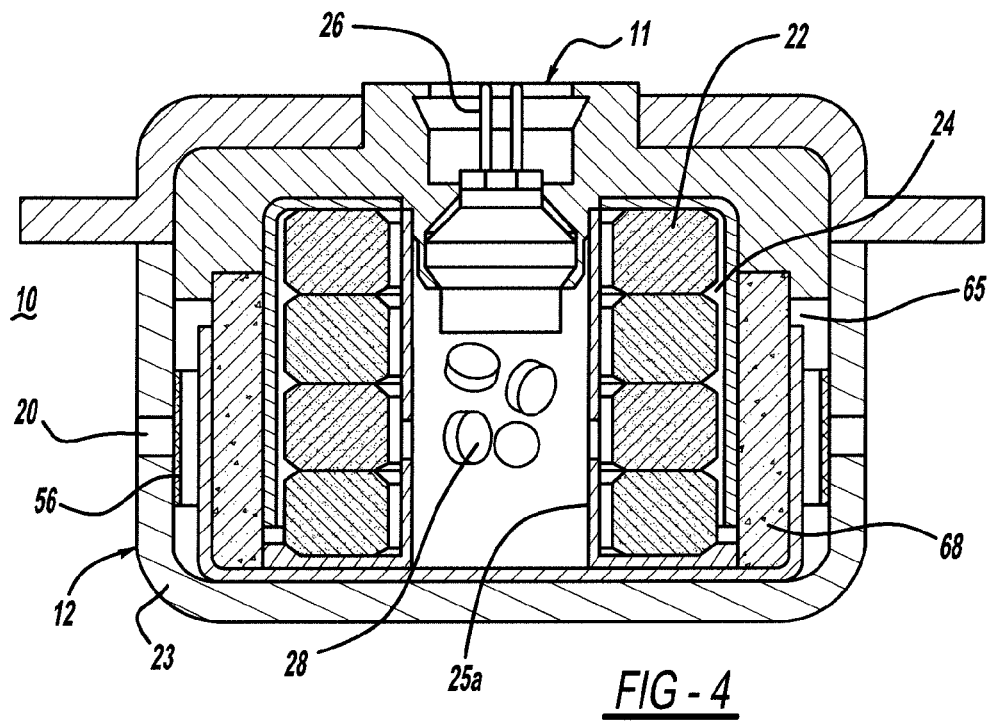
FIG. 4 is a cross-sectional side view of a third embodiment of a gas generating system in accordance with the present invention.
Figure 5:
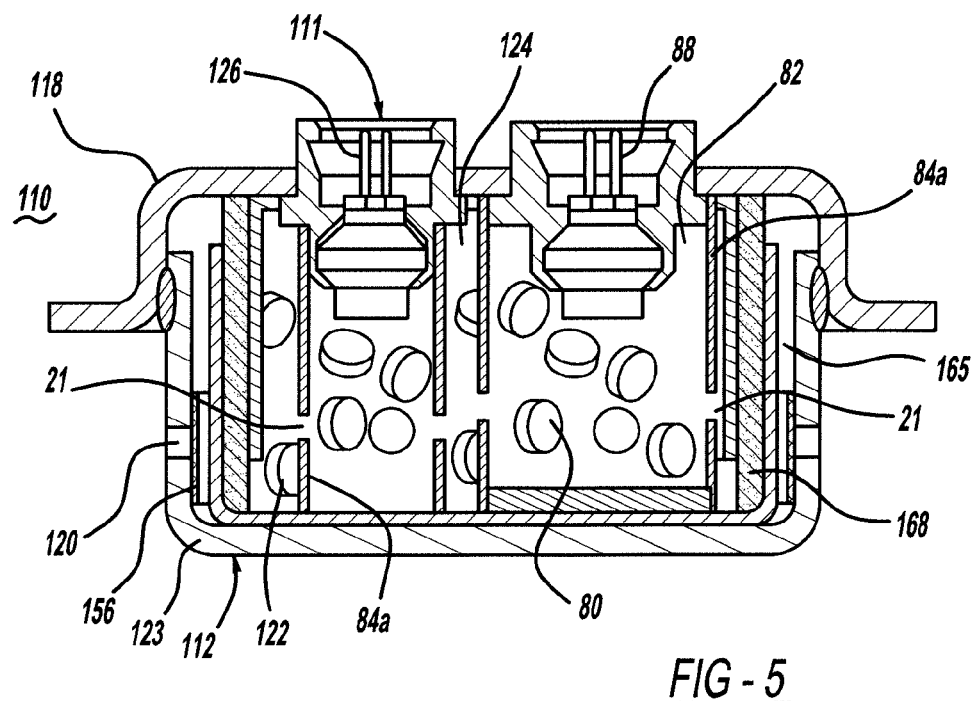
FIG. 5 is a cross-sectional side view of a fourth embodiment of a gas generating system in accordance with the present invention.

Alternatively, as shown in FIGS. 4 and 5, auto-ignition composition 29 may be combined with the booster composition 28 to form a single auto-ignition/booster composition 31 contained within tubes 84a. U.S. application Ser. No. 12/384,563, filed on Apr. 7, 2009, herein incorporated by reference, describes auto-ignition/booster compositions as immediately described below. The auto-ignition temperature in that case would therefore be less than 215 C, and more preferably at less than 205 C and even more preferably at less than 200 C. An auto-ignition/booster (AIB) composition may include a primary fuel, a salt of tetrazole, a metallic oxidizer, and a catalyst. An acidic and aromatic primary fuel is provided that is selected from a tetrazole such as 5-aminotetrazole; a benzene-based fuel such as dinitrobenzoic acid, dinitrobenzamide; and nitroisophthalic acid; and mixtures thereof. The primary fuel is generally provided at about 1-50 wt % of the total composition. The AIB composition may also contain an aromatic or non-aromatic basic constituent selected from amino compounds, salts of amino compounds, alkali metal salt such as a salt of tetrazole is selected from alkali metal salts including potassium 5-aminotetrazole and sodium 5-aminotetrazole, a potassium salt of an aromatic or benzene-based salt such as potassium dinitrobenzoate, and mixtures thereof. The basic constituent is generally provided at about 1-50 wt % of the total composition. An oxidizer is selected from metal oxidizers including alkali metal oxidizers such as potassium nitrate, sodium nitrate, and mixtures thereof. The metallic oxidizer is generally provided at about 35-75 wt % of the total composition. An additive is provided from catalytic non-oxidizing molybdenum-containing constituents including powdered molybdenum, molybdenum trioxide, and mixtures thereof. The catalyst is generally provided at about 1-10 wt % of the total composition.

A filter assembly 68 may be formed from wire mesh filter or other known materials, as known in the art. Alternatively, filter assembly 68 may be formed from a structured porous media such as low-density sintered metal and/or brazed metal spheres or balls that preferably range from 0.5-1.5 mm in diameter, but are not thereby limited. Filter assembly 68 filters and cools the gases generated by combustion of gas generant 22. The metal spheres may be provided from MIYANA of Nagano, Japan for example. Once sintered or brazed, the metal 185 spheres are joined to form a cylindrical filter that provides substantially uniform gas permeability across the volume of the filter. Furthermore, the present filter and the manufacturing thereof provides a relative increase in the performance of the gas generating system given the greatly enhanced heat sink properties of the filter as compared to conventional compressed and/or expanded metal mesh filters. As shown in FIG. 1, the sintered/brazed metal filter may be formed as an annular cylinder radially outward of the combustion chamber 24. A plenum 65 is formed radially outward of the filter 68 and radially inward of an outer wall of the housing 12.

The structured porous media that may be used provides a higher effective heat transfer coefficient by increasing the total surface area of filter material available for heat transfer. The concept is to minimize the flow path length of combustion gases through the porous medium while optimizing the porous medium characteristics (such as total material surface area exposed to the gases, the number of fluid flow passages formed within the porous material matrix, and other characteristics) in order to minimize the friction pressure drop for a given heat transfer performance.

Figure 2:
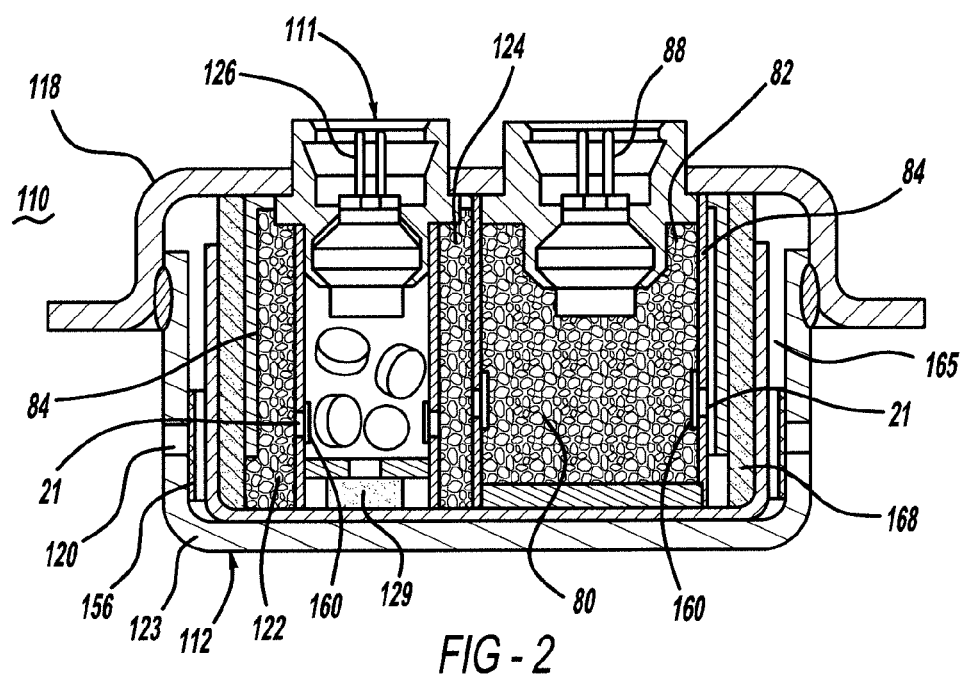
FIG. 2 is a cross-sectional side view of a second embodiment of a gas generating system in accordance with the present invention.
Figure 3:
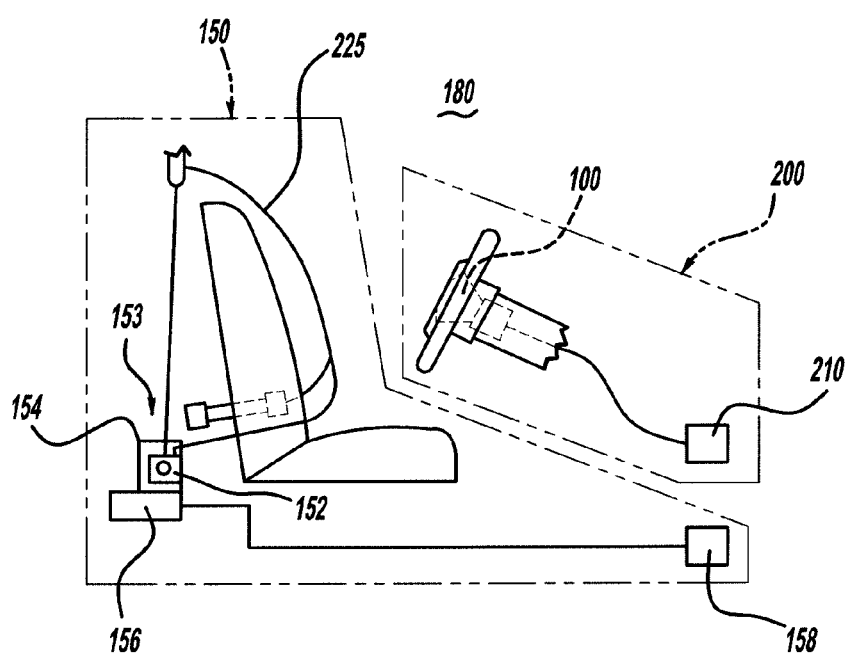
FIG. 3 is a schematic representation of an exemplary vehicle occupant restraint system incorporating a gas generating system in accordance with the present invention.

FIG. 2 shows an alternative embodiment 110 of the gas generating system. In FIG. 2, like numerals are used to identify features similar to those identified in FIG. 1. Referring to FIG. 3, in the alternative embodiment, gas generating system 110 may include a second inflation fluid source positioned within housing 112 in fluid isolation from the first inflation fluid source. The second inflation fluid source is also positioned such that filter assembly 168 is fluidly interposed between the second inflation fluid source and housing lower portion 123.

In the embodiment shown in FIG. 2, the second inflation fluid source comprises a second gas generant composition 80 positioned within a combustion chamber 82 defined by a shell 84. Shell 84 may be formed from a metal or metal alloy. Similar to gas generant 22 described above, second gas generant 80 may be any known gas generant composition (including a smokeless gas generant composition) useful for airbag application and is exemplified by, but not limited to, compositions and processes described in U.S. Pat. Nos. 5,035,757, 5,872,329, 6,074,502, 6,287,400, 6,306,232 and 6,475,312 each incorporated by reference herein. Other suitable compositions are set forth in the U.S. patent application Ser. No. 10/407,300 and Ser. No. 60/369,775, incorporated by reference herein.

A second igniter 88 is secured to gas generating system 110 so as to enable fluid communication with second gas generant 80 upon activation of the second igniter. In the embodiment shown in FIG. 2, second igniter 88 is positioned and secured within another opening in upper housing portion 118 using known methods. In another alternative embodiment (not shown), a perforated igniter support tube may be welded or otherwise fixed within the housing 12 to support second igniter 88. The perforated support tube allows a flame front generated by second igniter 88 to pass to gas generant 80, thereby igniting the gas generant and producing an inflating gas. In this alternative embodiment, shell 84 forms a second combustion chamber 82 for containment of second gas generant 80. Second igniter 88 may be formed as known in the art. One exemplary igniter construction is described in U.S. Pat. No. 6,009,809, herein incorporated by reference. If desired, second igniter 88 may be simultaneously or subsequently ignited with first igniter 26, thereby producing additional inflation gases from second gas generant 80. As in the embodiment previously described, a filter formed from a structured porous media occupies a plenum 65 formed between the gas generants 22 and 80 and housing 12, thereby functioning to cool the gases and also buffer the high pressure flow of the combustion gases.

Referring to FIG. 1, upon a crash event and during operation of the gas generating system, a signal from a crash sensor (not shown) is conveyed to igniter 26, thereby activating booster propellant 28. In the embodiment 225 shown in FIG. 2, a signal from the crash sensor may also be conveyed (simultaneously or subsequently) to second igniter 88, thereby activating second igniter 88 and igniting second gas generant 80. Heat from ignition of booster propellant 28 is transferred through openings in tube 25, thereby igniting gas generant 22. Inflation gas produced by combustion of gas generant 22 proceeds out through filter/heat sink 68 and into plenum 65. Gases then flow through openings 20 and out of the housing into an associated airbag (not shown).

Referring now to FIG. 3, an airbag module 100 including any of the gas generating system embodiments 10, 110 described above may also be incorporated into a comprehensive vehicle occupant restraint system 180 including elements such as, for example, a safety belt assembly 150. FIG. 3 shows a schematic diagram of one exemplary embodiment of such a restraint system. Airbag module 100 may be in communication with a crash event sensor 210 which is in communication with a known crash sensor algorithm that signals actuation of airbag 235 module 100 via, for example, activation of igniter 26 (FIG. 1) in the event of a collision.

Safety belt assembly 150 includes a safety belt housing 152 and a safety belt 225 extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

The benefits of the present invention have been experimentally evaluated and confirmed.

Comparative Example 1

An inflator was manufactured as shown in FIG. 5. For comparative purposes, the primary gas 255 generant combustion chamber and the AIB chamber 84 were sealed to prevent vapor communication between the chambers. A "smokeless" gas generant and a single AIB composition were used as described herein. The inflator was heat aged at 107 C for 408 hours. The inflator was also cycled between −40 C to 90 C, with a dwell time of 30 minutes between cycling from one extreme to the other, two hundred times. Eight trials were conducted in this manner. Upon activation of the inflator in each trial, the tank pressure/time (at 85 C in a 60 L tank) of the resulting inflator gases was lower than expected or desired.

Example 2

An inflator was manufactured in the same manner as Example 1. The same primary gas generant and the same MB compositions were employed. In contrast to Example 1, the combustion chamber and the MB chamber were perforated to permit vapor communication between the two chambers. The inflator was heat aged at 107 C for 408 hours. The inflator was also cycled between −40 C to 90 C, with a dwell time of 30 minutes between cycling from one extreme to the other, two hundred times. Eight trials were conducted in this manner. Upon activation of the inflator in each trial, the gases generated resulted in a satisfactory tank pressure over time (at 85 C in a 60 L tank), for each trial conducted.

Example 3

An inflator was manufactured in the same manner as Example 1. The same primary gas generant and the same MB composition were employed. In contrast to Example 1, the combustion chamber and the MB chamber were perforated to permit vapor communication between the two chambers. In contrast to Example 2, these inflators also contained 13× zeolite as commercially available, in vapor communication with the contents of the AIB and primary gas generant chambers. The inflator was heat aged at 107 C for 408 hours. The inflator was also cycled between −40 C to 90 C, with a dwell time of 30 minutes between cycling from one extreme to the other, two hundred times. Eight trials were conducted in this manner. Upon activation of the inflator in each trial, the gas generated resulted in an optimum tank pressure over time, for each trial conducted. Although the curves defining tank pressure over time formed a tighter group (when evaluating the five trials taken together), as compared to Example 2, the inflators of Example 2 still provided acceptable and satisfactory tank pressure over time (at 85 C in a 60 L tank), without the addition of zeolite.

In view of the examples, and in yet another aspect of the invention, a method of controlling off-gas products is provided. An inflator containing perforate chambers is provided. Specifically, the inflator contains a first perforate primary gas generant combustion chamber, a second perforate chamber, and additional perforate chamber(s) if desired. The various chambers are provided to be in vapor communication with at least one of the other chambers prior to activation of the inflator. In a preferred embodiment, all chambers are in vapor communication with each other. If desired, an adsorbent is also provided in vapor communication with the first perforate chamber.

It is believed that the advantages attendant to the gas generating system formed in accordance with the present invention will translate into similar benefits with regard to the airbag module and with regard to the vehicle occupant restraint system in general. These advantages include, for example, relatively lower filter and gas generating system weight, lower system cost, improved system performance through more uniform gas flow, improved filter efficiency resulting in reduced ballistic variability, and relative ease of gas generating system manufacture.

The present description is for illustrative purposes only, and should not be construed to limit the breadth of the present invention in any way. Although the present inflator is described as preferably mounted on the driver side of a conventional automobile, the inflator might be applicable in other locations within the automobile, or in other environments and applications such as military use. Thus, those skilled in the art will appreciate that various modifications could be made to the presently disclosed embodiments without departing from the spirit and scope of the present invention.

What is claimed is:

1. A gas generator comprising:
    a housing;
    a perforate primary gas generant combustion chamber containing a first perforation;
    a primary gas generant contained within said primary gas generant chamber;
    a perforate booster chamber operatively associated with said primary gas generant chamber, said perforate booster chamber containing a second perforation;
    an auto-ignition booster composition contained within said booster chamber, said auto-ignition booster composition containing a primary fuel, a basic constituent, a metallic oxidizer, and a catalyst;
    an igniter for igniting said composition within said booster chamber, for combusting said primary gas generant;
    a perforate auto-ignition chamber in thermal communication with said housing, said auto-ignition chamber containing a third perforation;
    an adsorbent in vapor communication with said primary gas generant chamber prior to actuation of said gas generator;

at least one permeable material covering the second and third perforations; and an auto-ignition composition contained within said auto-ignition chamber, wherein said primary gas generant chamber, said booster chamber, and said auto-ignition chamber are in vapor communication with each other prior to activation of said gas generator, and, said perforate auto-ignition chamber is separate from said perforate booster chamber.

2. The gas generator of claim 1 wherein said adsorbent comprises zeolite in vapor communication with the primary gas generant chamber.

3. The gas generator of claim 1 further comprising at least one material selected from cheesecloth, Tyvek, neoprene, metallic screen, and/or non-metallic screen covering the second and third perforations.

4. A gas generator comprising:

a housing;

a perforate primary gas generant combustion chamber containing a first perforation;

a primary gas generant contained within said primary gas generant chamber, a perforate auto-ignition/booster chamber operatively associated with said primary gas generant chamber, said perforate auto-ignition/booster chamber containing a second perforation;

an auto-ignition/booster composition contained within said booster chamber, said auto-ignition booster composition containing—aprimary fuel selected from tetrazoles, benzene-based fuels, nitroisophthalic acid, and mixtures thereof; an aromatic or non-aromatic basic constituent selected from amino compounds; salts of amino compounds alkali metal salts of tetrazoles, a potassium salt of an aromatic or benzene-based salt and mixtures thereof; an oxidizer selected from alkali metal nitrate oxidizers; and a catalytic non-oxidizing molybdenum containing constituent selected from molybdenum, molybdenum trioxide, and mixtures thereof;

an adsorbent in vapor communication with the primary gas generant combustion chamber prior to actuation of said gas generator;

an igniter for igniting said composition within said auto-ignition/booster chamber, for combusting said primary gas generant;

wherein said primary gas generant chamber and said auto-ignition/booster chamber are in vapor communication with each other prior to activation of said gas generator.

5. The gas generator of claim 4 further comprising at least one permeable material covering the second perforation.

6. The gas generator of claim 4 further comprising at least one material selected from cheesecloth, Tyvek, neoprene, metallic screen, and/or non-metallic screen covering the perforations of each chamber.

7. The gas generator of claim 4 wherein said adsorbent comprises zeolite in vapor communication with the primary gas generant combustion chamber.

8. A gas generator comprising:

a housing;

a perforate primary gas generant combustion chamber, a primary gas generant contained within said primary gas generant chamber;

a perforate second chamber operatively associated with said primary gas generant chamber, said perforate second chamber containing perforations;

a second composition contained within said second chamber;

an igniter for igniting said second composition, for combusting said primary gas generant;

an adsorbent consisting of zeolite in vapor communication with the primary gas generant combustion chamber prior to actuation of said gas generator; and a permeable material covering said perforations of said perforate second chamber, wherein said primary gas generant chamber and said second chamber are in vapor communication with each other prior to activation of said gas generator.

9. The gas generator of claim 8 further comprising at least one material selected from cheesecloth, Tyvek, neoprene, metallic screen, and/or non-metallic screen covering the perforations of said perforate second chamber.

* * * * *

UNITED STATES PATENT AND TRADEMARK OFFICE
CERTIFICATE OF CORRECTION

PATENT NO. : 8,997,655 B1  
APPLICATION NO. : 12/794567  
DATED : April 7, 2015  
INVENTOR(S) : Ranson et al.

It is certified that error appears in the above-identified patent and that said Letters Patent is hereby corrected as shown below:

In the Specification

Column 3; Line 30; Please delete "105".

Column 3; Line 39; Please delete "110".

Column 3; Line 67; Please delete "125".

Column 4; Line 18; Please delete "135".

Column 4; Line 54; Please delete "155".

Column 5; Line 43; Please delete "185".

Column 6; Line 49; Please delete "225".

Column 7; Line 1; Please delete "235".

Column 7; Line 32; Please delete "255".

Column 7; Line 47; Please delete "MB" and insert --AIB--.

Column 7; Line 49; Please delete "MB" and insert --AIB--.

Column 7; Line 62; Please delete "MB" and insert --AIB--.

Column 7; Line 64; Please delete "MB" and insert --AIB--.

In the Claims

Column 9; Line 29; Claim 4; Please delete "aprimary" and insert --a primary--.

Signed and Sealed this  
Second Day of August, 2016

Michelle K. Lee  
*Director of the United States Patent and Trademark Office*